United States Patent [19]
Bradshaw et al.

[11] 3,751,206
[45] Aug. 7, 1973

[54] MACHINES FOR USE IN THE MANUFACTURE OF POTTERY WARE

[75] Inventors: Arthur Bradshaw; Frank W. Meadows; Harold Peake, all of Stoke-on-Trent, England

[73] Assignee: Service (Engineers) Limited, Staffordshire, England

[22] Filed: Mar. 10, 1971

[21] Appl. No.: 122,818

Related U.S. Application Data
[63] Continuation of Ser. No. 769,797, Oct. 23, 1968, abandoned.

[52] U.S. Cl.................. 425/264, 425/265, 425/266
[51] Int. Cl............................................. B28b 5/08

[56] References Cited
UNITED STATES PATENTS

| | | | |
|---|---|---|---|
| 2,470,638 | 5/1949 | Parmalee et al. | 425/265 |
| 3,245,130 | 4/1966 | Dowley et al. | 425/459 |
| 2,362,058 | 11/1944 | Emerson | 425/266 |
| 2,954,595 | 10/1960 | Choice | 425/459 X |
| 2,167,386 | 7/1939 | Kinnard | 425/459 X |
| 2,334,640 | 11/1943 | Miller | 264/312 X |

FOREIGN PATENTS OR APPLICATIONS

| | | | |
|---|---|---|---|
| 1,136,259 | 9/1962 | Germany | 425/265 |

Primary Examiner—J. Spencer Overholser
Assistant Examiner—B. D. Tobor
Attorney—Richard A. Wise

[57] ABSTRACT

The invention relates to machines for making articles or ceramic ware, e.g., flatware of china, porcelain or earthenware, from moist clay comprising automatic means for cutting a piece from an extruded column of clay, pressing the piece so that its thickness is reduced by at least one third, transferring the piece to a rotatable mould so that it covers a central portion thereof, and, while rotating the mould, further reducing the thickness of the piece and spreading it over the remaining mould surface by means of a rotating roller shaping tool.

3 Claims, 16 Drawing Figures

PATENTED AUG 7 1973          3,751,206

Inventors
Arthur Bradshaw
Frank W. Meadows
Harold Peake
By their Attorney
Cornelius H. Cleary.

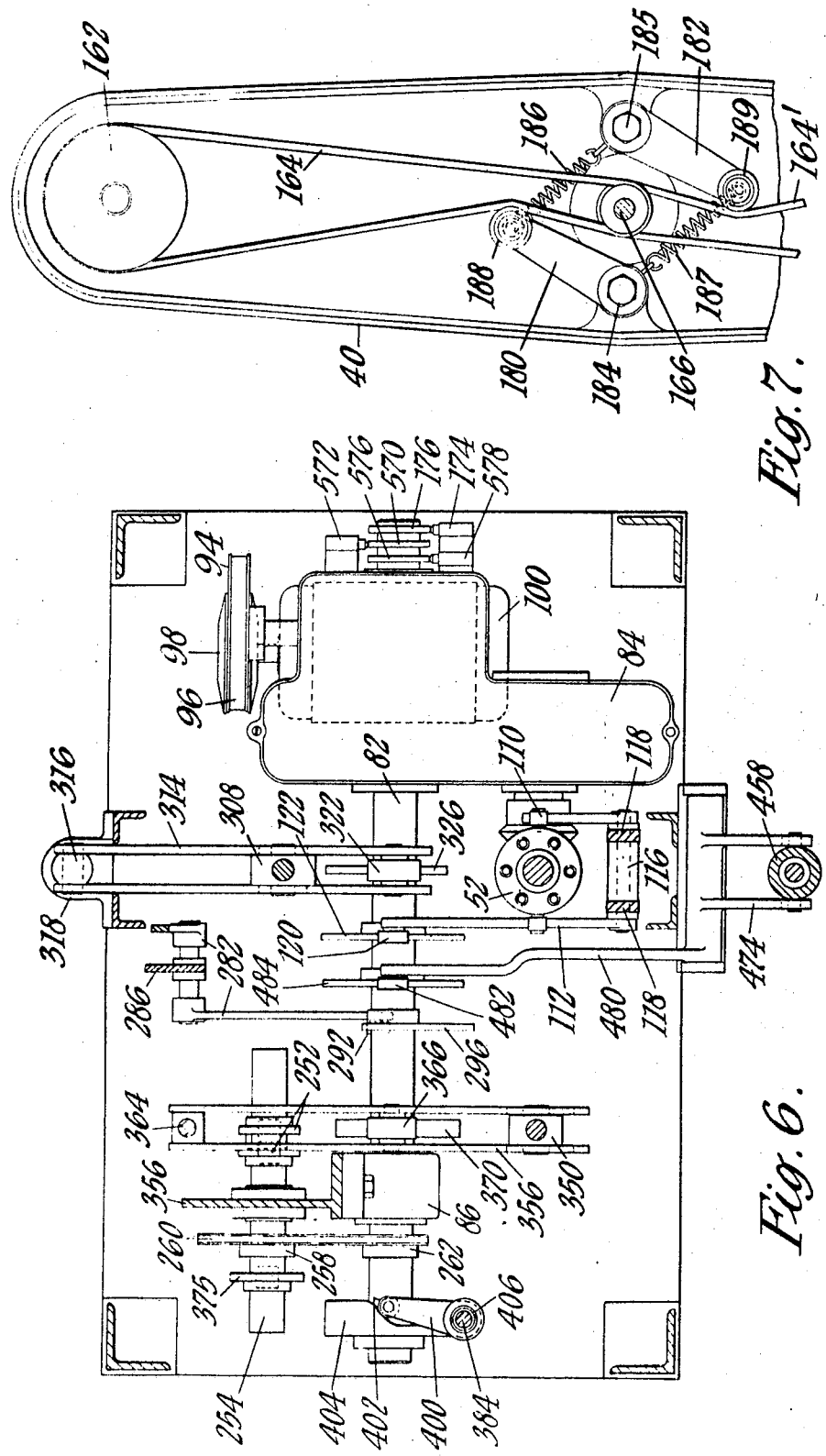

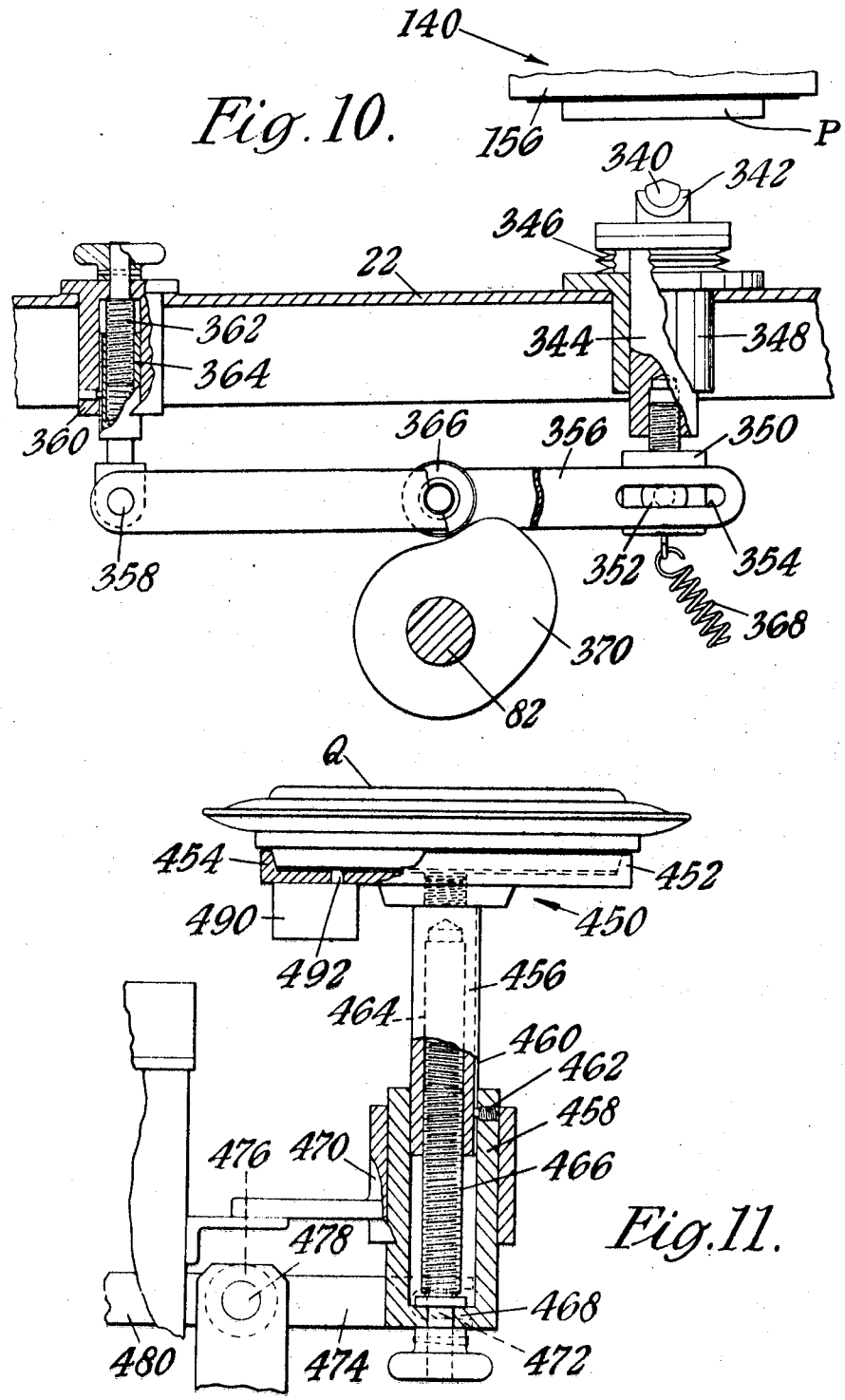

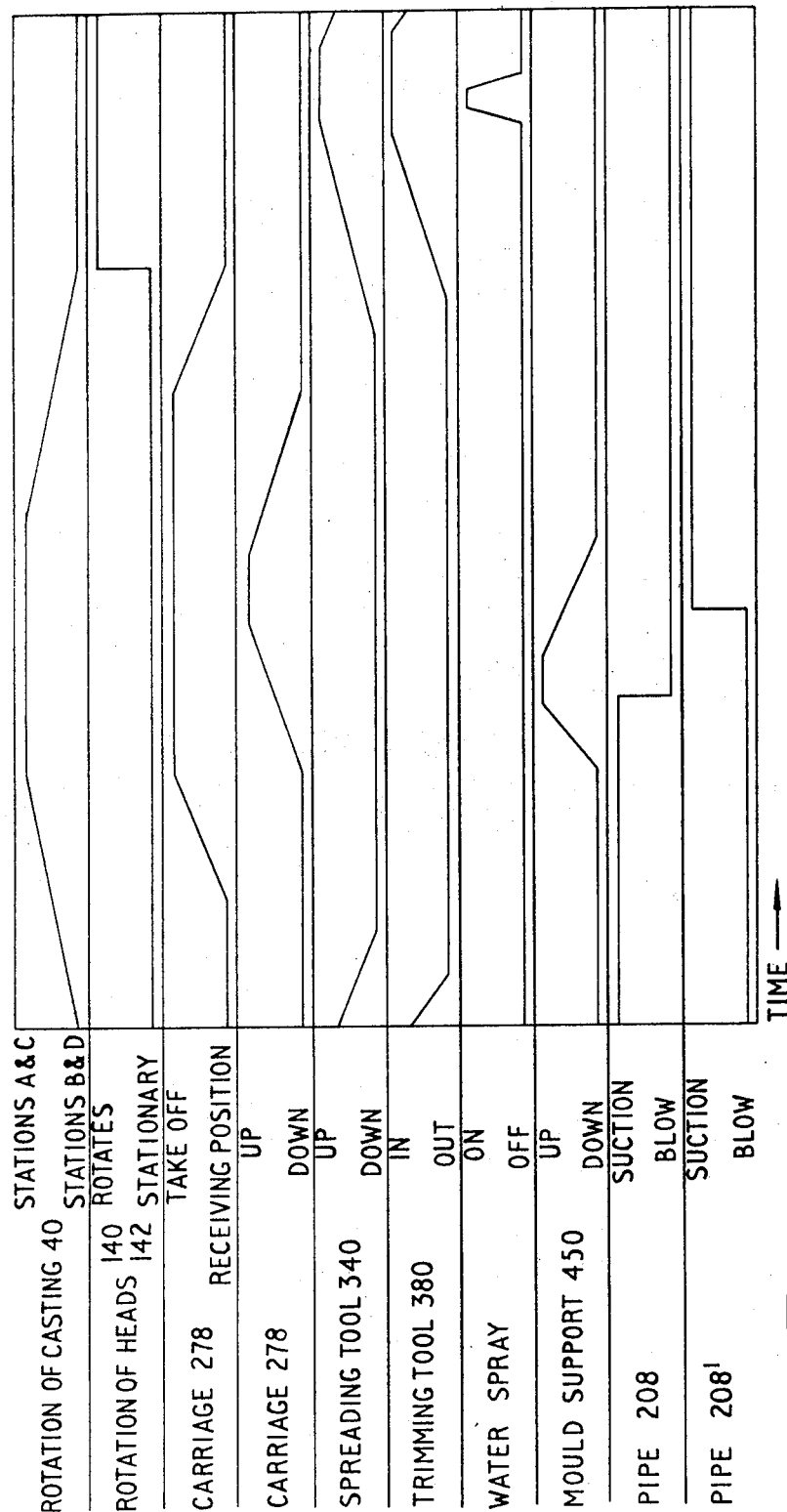

3,751,206

MACHINES FOR USE IN THE MANUFACTURE OF POTTERY WARE

This application is a continuation of an application filed in the names of Arthur Bradshaw, Frank W. Meadows and Harold Peake for improvements in Machines for Use in the Manufacture of Pottery Ware, U.S. Ser. No. 769,797, on Oct. 23, 1968 and now abandoned.

BACKGROUND OF THE INVENTION

Methods of making articles of ceramic ware, e.g., earthenware, china or porcelain flatware have been proposed comprising the steps of cutting a piece from an extruded column of clay, transferring the piece to a rotatable mould so that it covers a central portion thereof, and while the mould is rotating, subjecting the piece to the action of a roller shaping tool and machines suitable for use in carrying out such methods have been made.

In these methods it has been found that whereas small sizes of pottery flatware can be satisfactorily shaped at output speeds which are economic, difficulty has been experienced in manufacturing by such methods at high output speeds ware of larger sizes without production of an undesirably high proportion of ware of inferior quality.

It is believed that regions of incipient weakness are formed in the clay or the like during extrusion in carrying out the above methods and that these regions of weakness are largely responsible for the high proportion of ware of inferior quality in the larger sizes of ware. Attempts have been made to overcome these disadvantages by performing preliminary shaping operations but these have not proved entirely successful.

SUMMARY OF THE INVENTION

It is among the objects of the present invention to provide an improved method of making ceramic ware wherein the proportion of ware of inferior quality produced is reduced and to provide a machine for carrying out this method.

With the above and other objects in view, as will hereinafter appear, the present invention in one aspect thereof contemplates pressing a piece of clay cut from an extruded column thereof to reduce its thickness by at least one third and transferring the piece to a central portion of a rotatable mould and, while the mould is rotating, spreading the piece over the remaining mould surface by means of a rotating roller shaping tool.

According to another feature of the invention a machine is provided comprising a support for a piece of clay cut from an extruded column thereof, a head between which and the support in the operation of the machine relative movement of approach and separation takes place to deliver a piece from the support to an operative surface of the head against which the piece is held, means for transferring the piece from the head to a mould and limit means adjustable by an operator to limit the movement of approach between the support and the head to determine the thickness to which the piece is pressed.

The above and other features of the invention including various novel details of construction and combinations of parts, will now be more particularly described with reference to the accompanying drawings and pointed out in the claims. It will be understood that the described machine embodying the invention is shown by way of illustration only and not as a limitation of the invention. The principles and features of this invention may be employed in various and numerous embodiments without departing from the scope of the invention.

BRIEF DESCRIPTION OF THE DRAWING

In the accompany drawings:

FIG. 6 is a view in plan and partly in section on the line VI—VI of FIG. 2 of a lower portion of the illustrative machine showing cams and a motor thereof;

FIG. 7 is a fragmentary plan view of means of the illustrative machine for tensioning belts which drive the rotatable heads;

FIG. 10 is a view in left-hand side elevation, and partly in section, of means of the illustrative machine, including a face trimming tool, for operating on pieces of clay held by the rotatable heads;

FIG. 11 is a view, in left-hand side elevation and partly in section, of a mould support of the illustrative machine;

FIG. 16 is a diagram indicating the time relationships of the operations of parts of the illustrative machine in an operating cycle thereof.

DESCRIPTION OF THE PREFERRED EMBODIMENT

Figure 1:
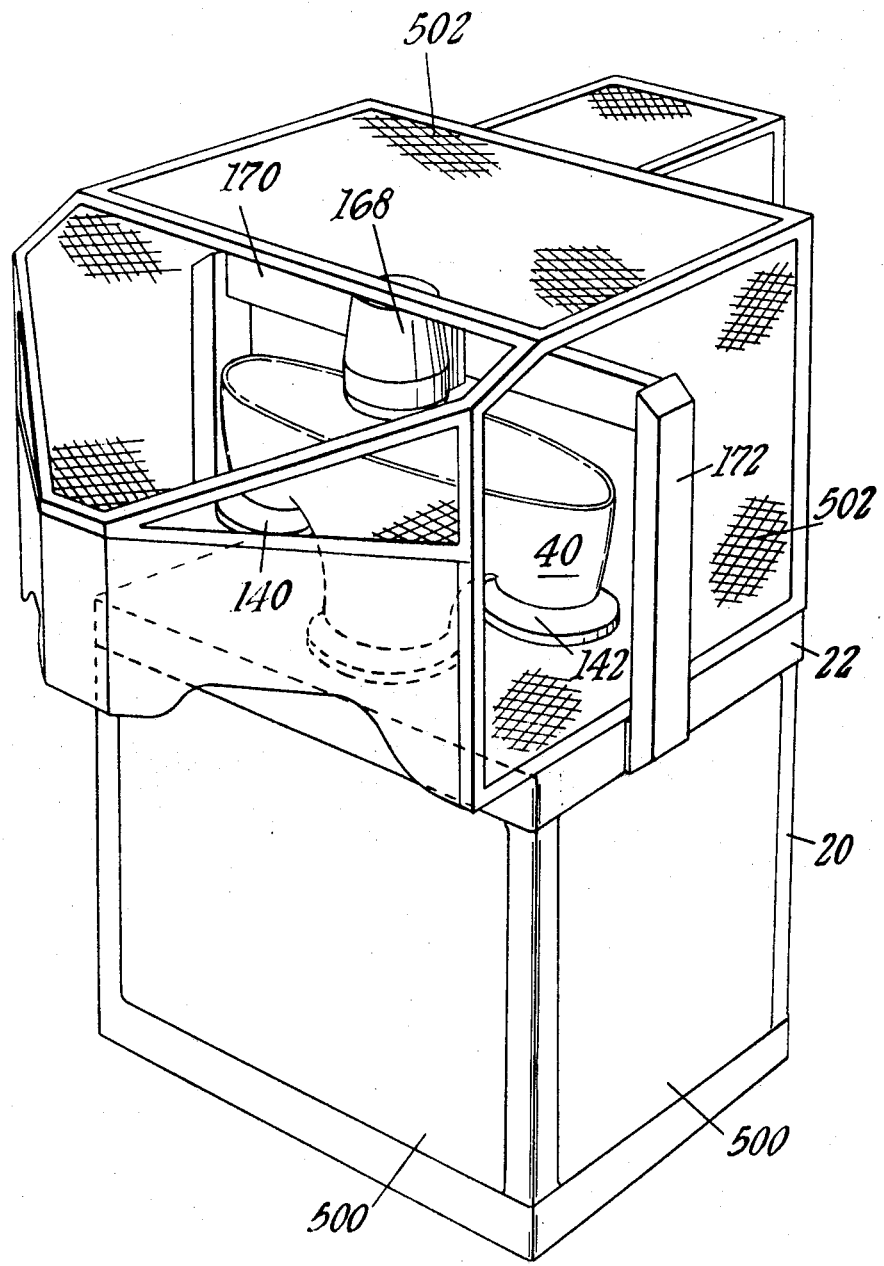
FIG. 1 is a perspective sketch of parts of the illustrative machine with parts omitted.

The illustrative machine comprises a housing 20 (FIGS. 1–4) arranged to stand on the floor and support a fabricated reinforced horizontal table 22. The table 22 has a central aperture 24 (FIG. 5) to accommodate a vertically disposed sleeve 26, a flange 27 of which rests on the table and is bolted thereto so that the sleeve projects both above and below the table. The sleeve 26 provides support for upper and lower ball-bearings 28, 30 which in turn support a shaft 32. The upper bearing 28 rests on an interior shoulder of the sleeve, and the lower bearings 30 abut a downwardly facing interior shoulder of the sleeve against which they are held by a cap 31 which surrounds the shaft and is bolted to the sleeve. The shaft 32 is tubular from its upper end for most of its length. At its upper end, the shaft has a flange 34 which rests on the upper bearing 28. To the flange is secured by bolts 36 a hub portion 38 of turret 40 (FIGS. 1 and 2) in the form of a T-shaped hollow casting, the hub-portion providing a skirt 42 which surrounds the upper portion of the sleeve 26. The shaft 32 is of reduced diameter where it passes through the lower bearing 30, and is threaded to receive nuts 44 which bear against the underside of the bearing.

The shaft 32 of the illustrative machine projects downwardly from the sleeve 26, and has keyed to it a bevel gear 46 (FIG. 5) which is retained on the shaft by a nut 48. An upper surface of the gear 46 has a hardened annular insert 50 and above the gear an annular brake shoe 52 surrounds a depending sleeve portion 56 of the cap 31 to which it is keyed for vertical sliding movement. The shoe 52 has a brake lining 54 opposed to the insert 50 and is urged downwardly by springs 58.

Figure 13:
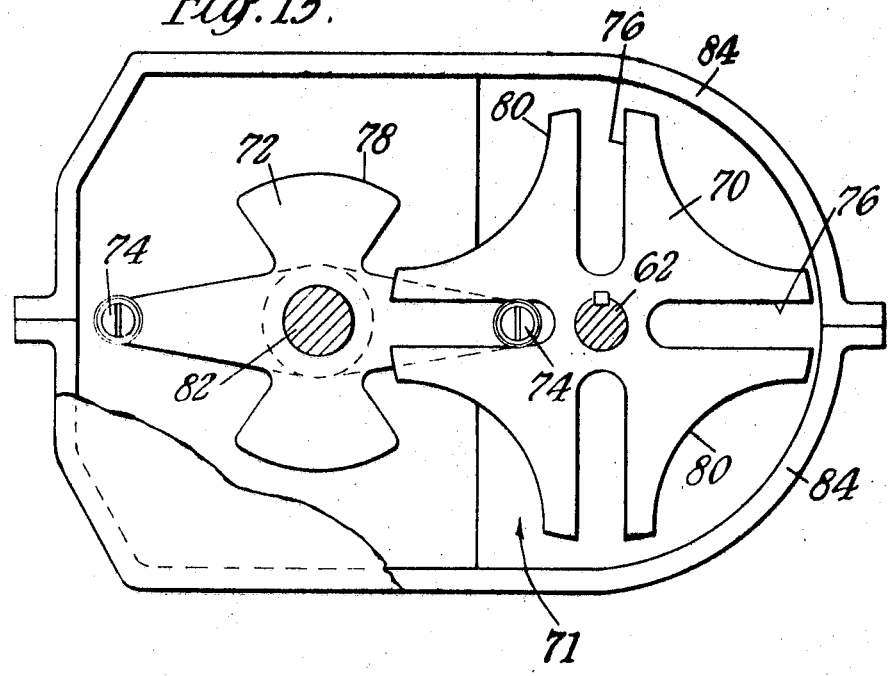
FIG. 13 is a view of a Geneva mechanism of the illustrative machine by which the casting is rotated step by step.

The bevel gear 46 on the shaft 32 of the illustrative machine is in mesh with a similar gear 60 (FIGS. 3, 4 and 5) on a horizontal lay shaft 62 supported by bearings and rotatable by a Geneva mechanism 71 (FIG. 13). The Geneva mechanism 71 has a star wheel 70 and drive member 72 which carries two diametrically opposite rolls 74 arranged to ride alternately in radial slots 76 disposed at 90° intervals around the star wheel 70. Convex locking surfaces 78 on the drive member 72 engage concave surface 80 of the wheel 70 between steps of rotation of the wheel to ensure that the shaft 62 remains stationary.

The drive member 72 (FIG. 13) is driven through a cam shaft 82, parallel to the lay shaft 62, and extending across the width of the housing 20. A box 84 mounted in the housing encloses the Geneva mechanism and provides bearings for the shafts 62 and 82. The cam shaft 82 is also supported by a bearing block 86 (FIGS. 2 and 4) depending from the table 22.

The cam shaft 82 of the illustrative machine carries at its right-hand end a worm wheel 88 (FIG. 2) which meshes with a worm 90 on a horizontal shaft 92 supported by bearings in the housing and carrying a pulley 94 driven by a V-belt 96 from a variable-speed pulley 98 on the output shaft of an electric motor 100 (FIG. 3) supported from the housing by a bracket 102.

The brake shoe 52 mounted on the depending sleeve portion of the cap 31 of the sleeve 26 of the illustrative machine has two oppositely projecting pins 110 (FIG. 5) which rests on parallel arms 112, 114 secured to a horizontal shaft 116 freely pivotal in a bracket 118 depending from the table 22. One of the arms, 112, projects further than the other beyond the pins 110 and carries a roller 120 which rides on a peripheral surface of a cam 122 mounted on the cam shaft 82. A tension spring 124 interconnecting the arm 112 and a hook on the housing constantly urges the roller 120 downward on to the cam 122. The arrangement is such that raising of the arm 112 (and consequently also of the arm 114) by the cam 122 in the operation of the illustrative machine raises the brake shoe 52 out of engagement with the bevel gear 46, re-engagement taking place under the influence of the springs 58 when the arm 112 is allowed to rock downwardly by the cam. Such control of the shaft 32 by the brake shoe assists the slowing down and stopping of the casting 40 thus driven step by step about a vertical axis by the mechanism 71 to bring heads 140, 142 (FIGS. 1, 2 and 4) disposed at 180° to each other about said axis carried by arms 126, 128 FIG. 2 of the turret 40 successively into positions over four stations A, B, C and D (FIG. 5) disposed about said axis.

Each arm 126, 128 (FIG. 2) carries a rotatable work-supporting head 140, 142 respectively which, with means for suporting and driving them are similar in construction. Accordingly, only the head 140 (FIG. 5) on the arm 126 will be described in detail hereinafter, references to parts of the head 142 being indicated, where appropriate, by the same reference numerals as are used to identify corresponding parts of the head 140.

The head 140 of the illustrative machine comprises a vertical shaft 144 (FIG. 5) supported by upper and lower ball-bearings 146, 148 at the top and bottom of a sleeve 150 secured in a lower portion of the arm 126. At its lower end the shaft 144 has a collar 152 which abuts the under-surface of the bearing 148. Nuts 154 threaded on an upper end portion of the shaft 144 confine the bearings 146, 148 against internal shoulders of the sleeve. Below the collar 152 the shaft 144 supports a circular plate 156. The plate 156 has a depending peripheral rim 158 which defines a cavity 160; the cavity is closed by a porous disc 161 of sintered alumina bonded to an internal shoulder of the rim 158. The cavity 160 can be connected to suction or air under pressure through pipe 208.

At its upper end, the shaft 144 (FIG. 5) of the illustrative machine carries a pulley 162 arranged to be driven clockwise (viewed from above) by a belt 164 from a vertical shaft 166 above and coaxial with the shaft 32. The shaft 166 is supported by and driven by an electric motor unit 168 (FIG. 1) mounted on a bar 170 extending between uprights 172 mounted on the housing 20. A belt 164' which drives the shaft (not shown) of the head 142 is driven by the shaft 166. The motor 168 is arranged to stop and start under the control of a microswitch 174 operated by a cam 176 on the cam shaft 82, with the result that the heads 140, 142 begin to rotate as they reach stations B and D in the stepwise rotation of the casting 40, the motor 168 being stopped at the end of the dwell period of the heads at these stations.

Figure 5:
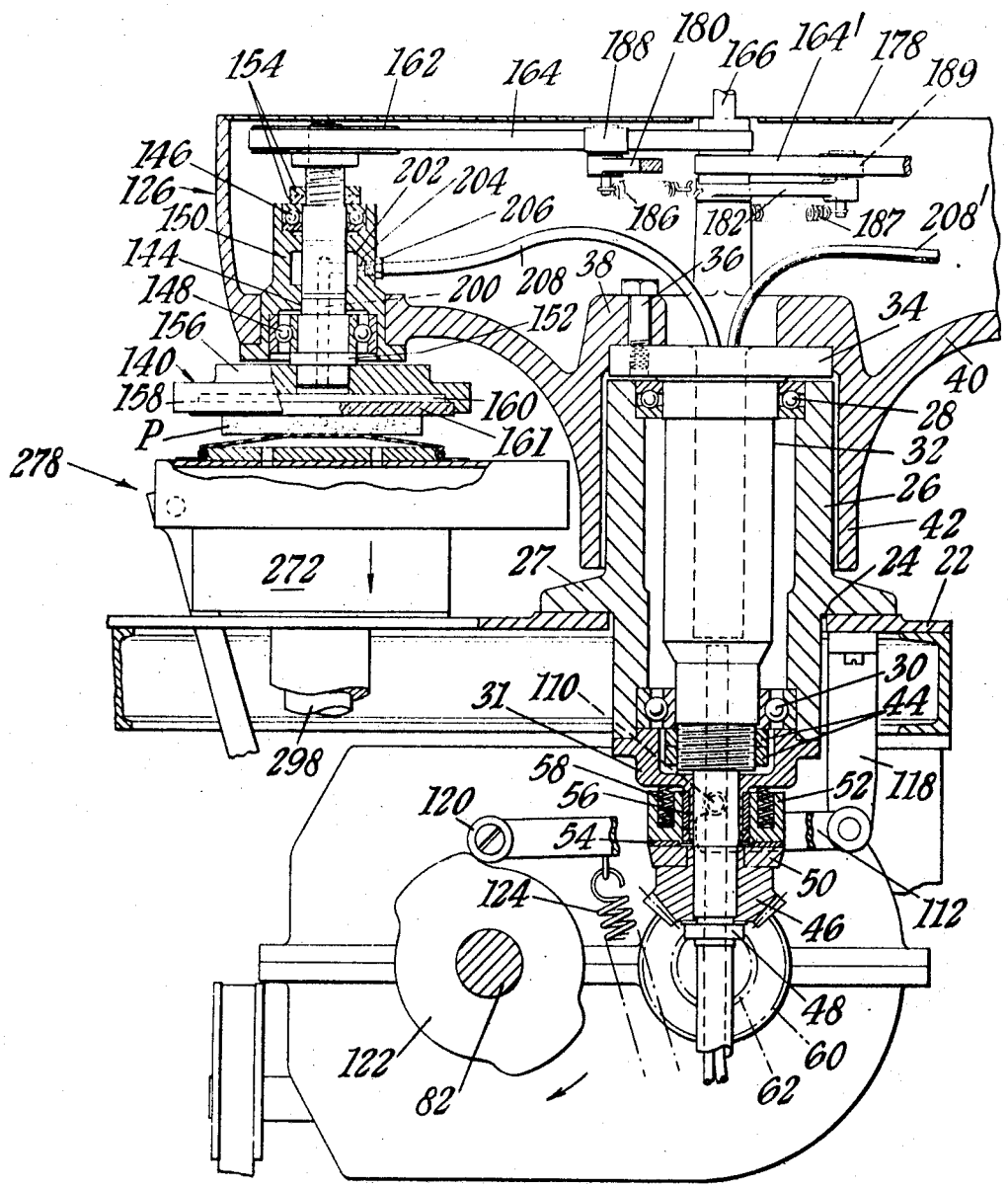
FIG. 5 is a view in elevation and largely in section of one of two rotatable clay-holding heads and part of a rotatable casting of the illustrative machine by which the heads are carried.

An otherwise open top of the casting 40 of the illustrative machine is closed by a horizontal cover plate 178 which encloses the belts 164, 164' (FIG. 5). The belts 164, 164' are tensioned by means (see FIG. 7) comprising arms 180, 182 pivoted on studs 184, 185 projecting from the casting 40 and urged to assume positions transverse to the general direction of the belt by springs 186, 187. The arms 180, 182 each carry a roll 188, 189 respectively which engages the respective belt 164, 164' under the influence of the springs.

The shaft 144 (FIG. 5) of the head 140 of the illustrative machine is bored axially from its lower end and radially at a distance therefrom to provide a passage 200 connecting the cavity 160 with an annular groove 202 in the sleeve 150. A port 204 in the sleeve 150 accommodates a coupling 206 and interconnects the groove 202 with a flexible pipe 208. The pipe leads from the coupling 206 down through the shaft 32 and out of a hole 210 (FIG. 12) in the side of the shaft at the bottom of its tubular portion and above a lower end portion 212. The portion 212 has two parallel bores 214, 216 extending longitudinally from the bottom of the shaft where they are closed by plugs 218. Upper and lower radial ports 220, 222 lead from the bore 214. The upper port 220 is connected to the pipe 208, and the lower one 222 opens into an annular peripheral groove 224 in the shaft 32. Similarly, upper and lower ports 226, 228 respectively connect the bore 216 with the pipe 208' leading to the head 142 and with an annular peripheral groove 230 above the groove 224.

Figure 2:
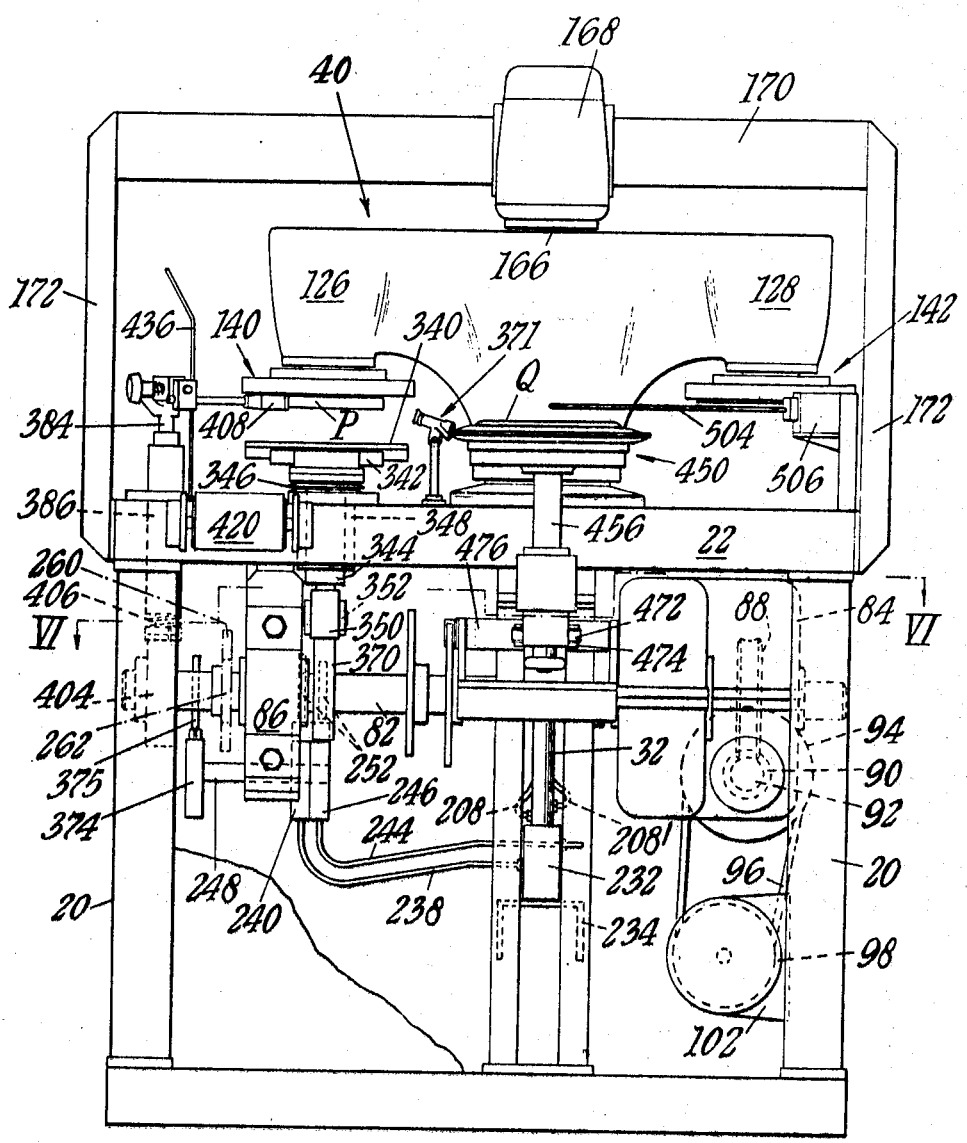
FIG. 2 is a view in front elevation, with parts broken away, of the illustrative machine.
Figure 12:
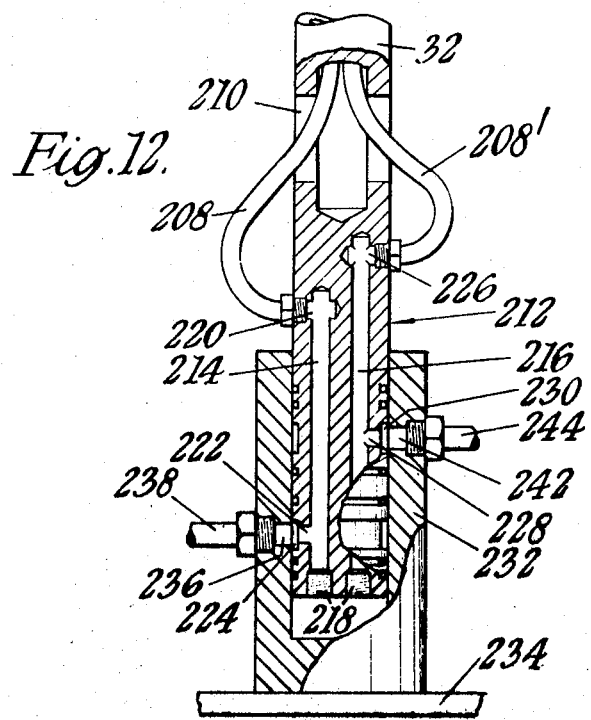
FIG. 12 is a fragmentary view, largely in section, of means of the illustrative machine for mounting a shaft associated with the casting which carries the rotatable heads and means for connecting pipes leading from the heads to air pressure and suction sources.

Around the lower end portion 212 of the shaft 32 of the illustrative machine is a sleeve 232 mounted on a bracket 234 supported by the housing 20. Through the sleeve 232 is a bore 236 opposite the groove 224 in the shaft and to the bore 236 is connected a flexible pipe 238 leading from a valve 240 (FIGS. 2 and 12). Similarly, the groove 230 is connected through a bore 242 and pipe 244 to a valve 246. Each of the valves 240, 246 is connected to both a source of compressed air and a source of suction provided by a vacuum pump (not shown) and has a valve spindle (not shown) which can assume one of two positions, a first one in which it connects the corresponding one of the pipes 238, 244 to air under pressure and a second one in which it connects the pipe to suction.

The two valves 240, 246 (FIG. 2) are mounted side-by-side on a bracket 248 secured to the housing 20 of the illustrative machine. The valve spindles of the two valves are urged upwardly by springs (not shown) into their first positions, and each carries a roller which engages the periphery of a cam 252, there being two such cams, one for each valve. The cams 252 are mounted for rotation on one end portion of a cam shaft 254 (FIG. 3), a middle portion of which is supported in a bearing 256 (FIG. 6) mounted on the bearing block 86. The other end portion of the shaft 254 carries a sprocket 258 driven by a chain 260 from a sprocket 262 secured on the cam shaft 82; the shaft 254 rotates at half the speed of the shaft 82. The cams 252 are independently adjustable about the shaft 254.

At a first one of the stations A is a support in the form of a carriage 278. The carriage 278 (FIGS. 3, 5, 8 and 9) is arranged to run on rollers 276 mounted on plates 270 secured to the table 22 by bolts 271 passing into brackets 272 so that the plates 270 can be adjusted vertically, to and fro towards and away from said axis to bring a circular horizontal platform 280 thereof into one of two positions, a first receiving position at which it can receive a disc-like piece of clay of desired thickness cut by a clay-cutting machine M1 of known type from an extruded column R of clay and a second take-off position in which it lies below, and in axial registration with, the position of rest assumed successively by the heads 140, 142 at station A. The platform 280 has a peripheral groove to afford retention for a spring band 279 by which a flexible, resilient rubber sheet 281 is kept taut (but not fully stretched) over the upper surface of the platform.

To and fro travel of the carriage 278 in the operation of the illustrative machine is effected by a two-armed bell-crank lever 282 (FIG. 9) pivoted at 284 on a bracket 286 depending from the table 22. One arm of the bell-crank lever 282 carries a horizontal rod 288 extending into vertical slots 289 in downwardly projecting aprons 290 along the sides of the carriage. The other arm of the lever 282 carries a cam roll 292 which is constantly urged under the influence of a spring 294 between the lever and the housing into peripheral engagement with a cam 296 on the cam shaft 82.

The carriage 278 rests on the rollers 276 under gravity, and means for raising it in the operation of the illustrative machine when the platform is in the take-off position comrises a vertically slidable plunger 298 (FIGS. 8 and 9) supported by a bearing 300 in the table 22. The plunger 298 has a flange 302 at its upper end which projects into slots 304 provided by two longitudinally disposed bars 306 underslung from the carriage 278. There is vertical play afforded between the under side of the carriage and the bars 306 for the flange 302 and sufficient allowance for the to and fro travel of the carriage. The plunger 298 is protected from dust by a flexible cover 307 secured to the flange 302 and the bearing 300.

Horizontal guide bars 309 on the inside faces of the aprons 290 lie close to the plates 270 to ensure that the carriage 278 follows a straight path. Gaps in the guide bars allow the bars to rise up past the rollers 276 when the carriage is lifted at the take-off position.

At its lower end, the plunger 298 of the illustrative machine has a block 308 on which lugs 310 are pivoted the lugs projecting into longitudinal slots 312 substantially midway along parallel arms of a lever 314 pivoted to a support 316. The support 316 is vertically adjustable in a bracket 318, mounted on the housing 20, by means of a screw 320 captive in the bracket and threaded into tbe support 316. At its other end, the lever 314 carries a cam roll 322 which rides under the influence of a spring 324, between the lever and the housing 20, on the periphery of a cam 326 mounted on the cam shaft 82. Rotation of the cam 326 causes the lever 314 to raise and lower the plunger 298 with consequent lifting and lowering of the carriage 278.

The foregoing arrangement is such that in the operation of the illustrative machine a piece of clay P delivered to the platform 280 when the carriage 278 is in its receiving position is carried to the take-off position below one of the heads 140, 142 and raised into contact with one of the porous discs 161, while the cavity 160 is connected to suction, the piece is then pressed between a surface of the head and a surface of the support until it is reduced in thickness by at least one third and preferably not more than one half the extent being determined by setting of the screw 320. Thereafter the plunger 298 is lowered, its flange 302 by engagement with the bars 306 ensuring that the carriage 278 falls away, the rubber sheet 281 readily peeling away and leaving the clay piece P held by suction to the head.

At a second station B of the machine, at which a head holding a piece of clay is next brought to rest, is a face trimming tool 340 (FIGS. 2, 3 and 10) which is raised to an adjustable height into contact with a lower face of the clay to lightly trim the face and an edge trimming tool 380 (FIGS. 2 and 4) which assumes an adjustable position to remove clay from the periphery of the piece. While at this station the heads 140, 142 of the illustrative machine are rotated. The horizontal face trimming tool 340 (FIGS. 2, 3 and 10) is disposed so that it lies, with respect to the position in which each head 140, 142 comes to rest at station B, on the axis of rotation of the head and parallel to the under surface of the porous disc 161. The face trimming tool 340 has an operative horizontal apical edge formed by flat faces inclined at 20° to the horizontal, an under surface of the tool being part-cylindrical and resting in a complementary groove of a tool holder 342 to which it is secured by screws. The tool holder 342 has a depending shaft 344 protected from dust by a flexible cover 346 and is vertically slidable in a bearing 348 in the table 22. At its lower end, the shaft, 344 carries a rectangular block 350 on which rectangular lugs 352 are pivoted. The lugs are accommodated in longitudinal slots 354 in parallel arms of a lever 356 pivoted at 358 to a support 364 vertically adjustable by means of a screw 362 threaded thereinto and captive in a sleeve 360 mounted in the table 22, the screw being accessible above the table. Substantially at its mid-point, the lever 356 carries a cam roll 366 which, under the influence of a spring 368 between the lever and the housing 20, rides against the periphery of a cam 370 on the cam shaft 82. The arrangement is such that, in the operation of the illustrative machine, the tool 340, which is restrained from rotation by the confinement of the block 350 between the arms of the lever 356, is raised at a rate controlled by the peripheral contour of the cam 370 into working engagement with a piece of clay P which has been brought to the station B by the head 140, the cavity 160 remaining in communication with the source of suction. The piece of clay is lightly trimmed and slightly reduced in thickness as it rotates in contact with the tool and the limit of upward movement of the tool determines the thickness to which it is so reduced; this upper limit is adjustable by means of the screw 362 and is set so that only a small amount of clay is trimmed from the face by the tool 340.

The edge trimming tool 380 (FIGS. 2 and 4) is mounted on an arm 382, a yoked end portion of which is freely pivoted on a vertical spindle 384 which passes through a bearing 386 in the table 22. Fixed to the spindle 384 and embraced by the yoked portion of the arm 382 is a finger 388 which is slotted to accommodate the shank of a headed screw 390 threaded in a tapped hole in the arm 382. A spring 392 surrounding the screw between the arm 382 and the finger 388 constantly urges the arm away from the finger to the limit imposed by the head of the screw. Thus, the position resiliently assumed by the tool 380 relative to the finger 388 about the axis of the spindle 384 can be adjusted by turning the screw 390. The spindle 384 where it depends below the table 22 has secured to it a horizontal arm 400 (FIGS. 3 and 6) which carries a cam roll 402 which rides against a contoured face of a cam 404 mounted on the cam shaft 82. The spindle 384 is urged anti-clockwise (as viewed from above) by a torsion spring 406 disposed around the spindle between the bearing 386 and the arm 400, biasing the cam roll 402 against the cam 404. The tool 380 has a hardened shoe 408 with a straight vertical cutting edge, and the arrangement is such that, in the operation of the illustrative machine, the shoe 408 is brought under the influence of the cam 404, but yieldable against the action of the spring 392, into a trimming position in which it removes clay from the periphery of a piece held by one of the rotating heads 140, 142 while the face trimming tool 340 is operating thereon, the diameter of the clay piece being determined by rotation of the screw 390 to adjust the limit of movement of the shoe towards the axis of rotation of the head.

Water-spraying means 371 (FIGS. 2 and 3) is provided at station B of the illustrative machine for wetting the clay while it is being worked upon by the face trimming tool 340. The means 371 comprises a conventional spray gun 372 adjustably mounted on a vertical post 373 so that it directs a water spray upwardly towards the lower surface of a piece of clay P on one of the rotating heads 140, 142. The gun 372 is connected by flexible hoses (not shown) to compressed air and water supplies, and operation of the gun is controlled by an air valve 374 which is arranged to be opened (to cause a jet of water to issue from the gun) and closed by a cam 375 on the shaft 254; thus, the valve 374 is mounted on the bracket 248 and a valve spindle thereof is spring-urged towards the periphery of the cam.

Figure 3:
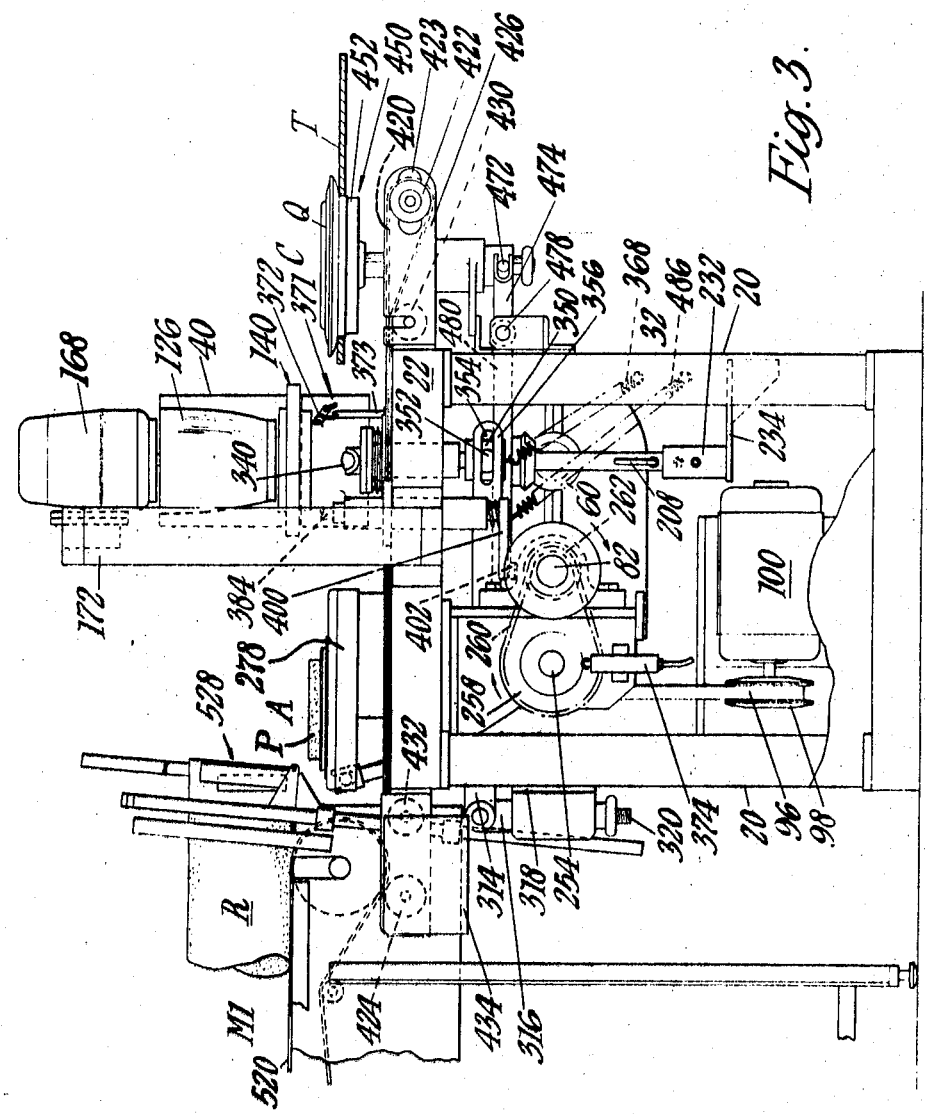
FIG. 3 is a view in left-hand side elevation, with parts broken away, of the illustrative machine showing, in addition, a portion of a clay cutting machine and part of a turntable associated with a roller flatware making machine.
Figure 4:
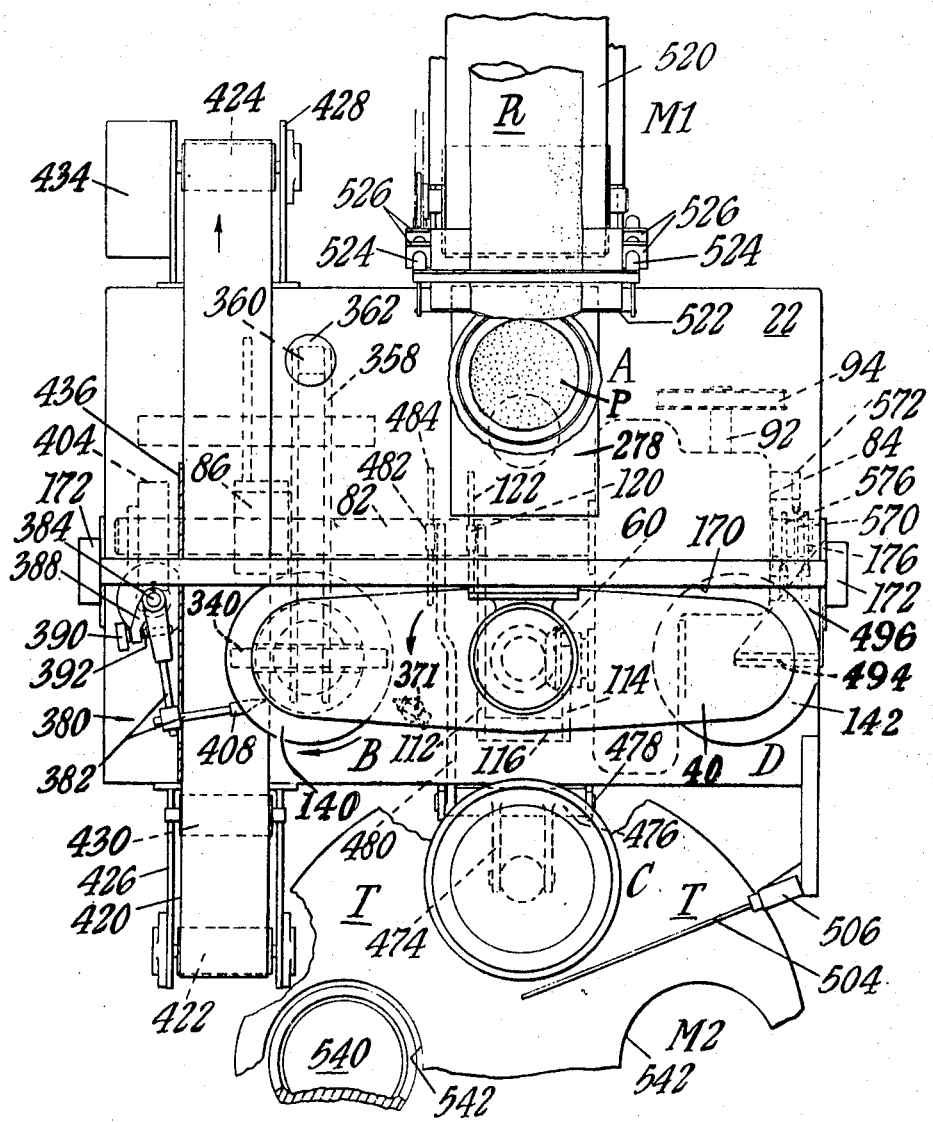
FIG. 4 is a view in plan showing the illustrative machine and parts of the clay cutting machine and turntable depicted in FIG. 3.

A conveyor belt 420 (FIGS. 2, 3 and 4) is mounted beneath the trimming tools 340, 380 at station B to remove clay trimmed from a piece by the tools. A horizontal upper reach of the belt 420 runs rearwardly of the machine over front and rear rollers 422, 424. The front roller 422 is mounted on a spindle adjustably secured in longitudinal slots 423 (FIG. 3) in a bracket 426 projecting forwardly from the housing 20, and the rear roller 424 is supported by a bracket 428 projecting rearwardly from the housing. The lower reach of the belt 420 is guided over the table between the rollers 422, 424 by two rollers 430, 432 supported near the front and back of the table 22 by the brackets 426, 428 respectively. The roller 424 is driven continuously, in the operation of the illustrative machine, at a uniform speed by an electric motor and reduction gear unit 434 (FIG. 4). The arrangement is such that surplus material trimmed off a piece of clay by the tool 380 flies against a vertical wall 436 and falls therefrom on to the belt 420 and is conveyed rearwardly to drop into a receptacle (not shown) below the roller 424.

At a third station C of the machine a mould support 450 (FIGS. 2, 3 and 11) of the machine receives a plaster mould Q from a turntable T associated with a roller flatware making machine M2 of known type and raises the mould into engagement with a piece of clay held by one of the heads 140, 142 at this station. The mould support 450 comprises a circular platform 452 with an upstanding rim 454 which tapers to provide a part-conical inner wall complementary to the part-conical foot of a conventional plaster mould Q (see FIGS. 2 and 3). Screwed into a central part of the platform 452 is a depending vertical shaft 456 (see FIG. 11) mounted in sleeve 458. The shaft has a keyway 460 into which projects a key 462 threaded through the sleeve 458. A tapped bore 464 extends axially up the shaft 456 from its lower end, and a screw 466 held captive for free rotation by an internal flange 468 at the bottom of the sleeve is threaded into the bore 464. The arrangement is such that the heightwise position of the mould support 450 relative to the sleeve 458 can be adjusted by turning the screw 466.

The sleeve 458 of the illustrative machine is slidably mounted in a vertical sleeve portion of a bracket 470 secured to the front of the housing 20. Pins 472 projecting from opposite sides of the sleeve at its lower end are accommodated in bifurcated end portions of two parallel arms 474 (FIGS. 2, 3, 4 and 11) projecting forwardly from a sleeve 476 with which they are integral. The sleeve 476 is freely mounted on a horizontal pivot pin 478 supported by the bracket 470. Rearwardly from the sleeve 476 projects an integral arm 480 which carries a roll 482 arranged to ride on the periphery of a cam 484 on the cam shaft 82 (FIG. 4). A spring 486 (FIG. 3) constantly urges the roll 482 towards the cam 484, but the arrangement is such that, in the operation of the illustrative machine, when one of the heads 140, 142 has come to rest at station C, the cam roll 482 is arrested clear of the cam 484 by engagement of a mould on the support 450 with a piece of clay P on the head which piece is thus pressed against the mould by the action of the spring 486. The mould support 450 is thus yieldably mounted so that it exerts a predetermined pressure on the clay while the clay is still in contact with the head. Suction is relieved after the mould Q contacts the clay and air under pressure is supplied to the cavity 160 to ensure release of the piece from the head when the mould support 450 descends and thus transfer the clay from the head to the mould Q; the arrangement of the machine is such that the piece P of clay is accurately positioned concentrically on a central portion of the mould.

The roller flatware making machine M2 comprises a generally conical roller tool (not shown) with an obtuse apical angle arranged while rotating about an axis which progressively increases in inclination from the vertical to operate on a clay piece P on a mould Q rotating on a jigger head 540. The roller tool is heated and its operation is similar to that of the tool described in United Kingdom patent specification No. 765097. The machine M2 also comprises the turntable T (FIG. 4) having four holes 543 of a diameter to embrace not only the part-conical foot of a mould but also an annular shoulder which rests on the rim 454 of the mould support 450 and on a similar rim on the jigger head 540 of the machine M2. The turntable T is arranged in the operation of the illustrative plant to move step by step first to lift moulds off the mould support 450 and jigger head 540, to rotate 90°, and then to fall to deposit successive moulds on the support 450 and jigger head, the moulds from the support being thus transferred to the jigger head. A microswitch 490 (FIG. 11) secured to the underside of the platform 452 of the mould support of the illustrative machine has a button 492 which projects up through a hole in the platform and is arranged to be depressed to operate the switch by a mould Q properly positioned on the platform 452.

Figure 14:
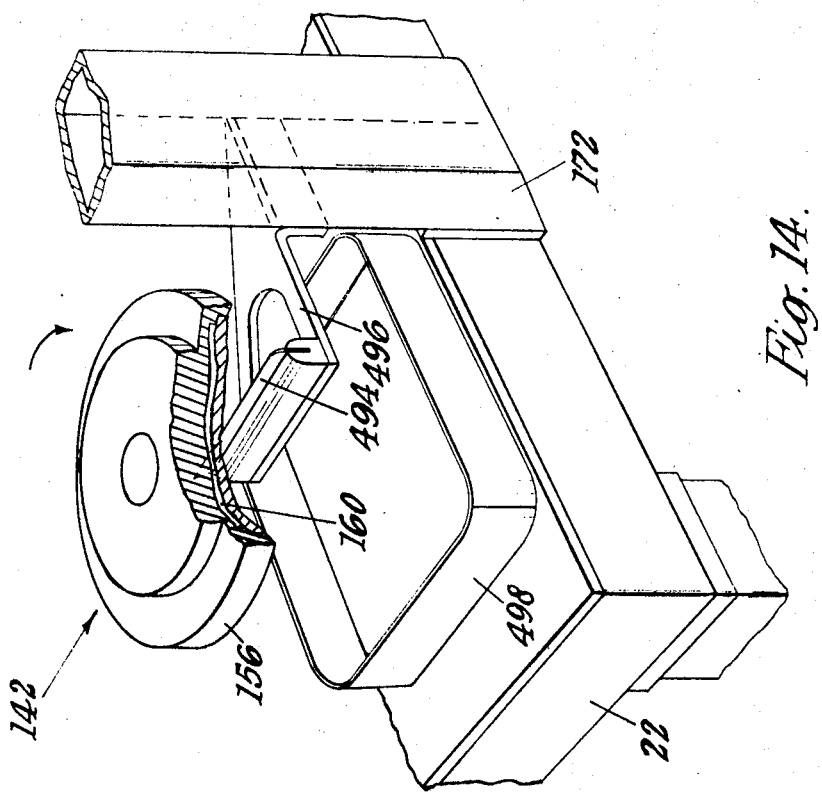
FIG. 14 is a view of a wiper blade of the illustrative machine.

At a fourth station D of the machine air under pressure continues to be supplied to the cavities 160 of the heads to blow moisture and particles of clay from the interstices of the porous member 161, 161' and the heads are rotated to assist removal of the moisture and particles from the heads. Also a horizontally disposed rubber wiper blade 494 (FIG. 14) is provided to wipe the porous members at this station to assist removal of the moisture and particles of clay. The blade 494 is held by a bracket 496 secured to the adjacent upright 172. A drip tray 498 is disposed on the table 22 therebeneath (FIG. 14).

The illustrative machine is guarded below the table 22 by metal panels 500 (FIG. 1), and above the table by wire mesh screens 502. A conventional detector probe 504 projecting from a microswitch housing 506 is arranged to operate the switch if it is deflected from its position as shown in FIGS. 2 and 4.

Figure 8:
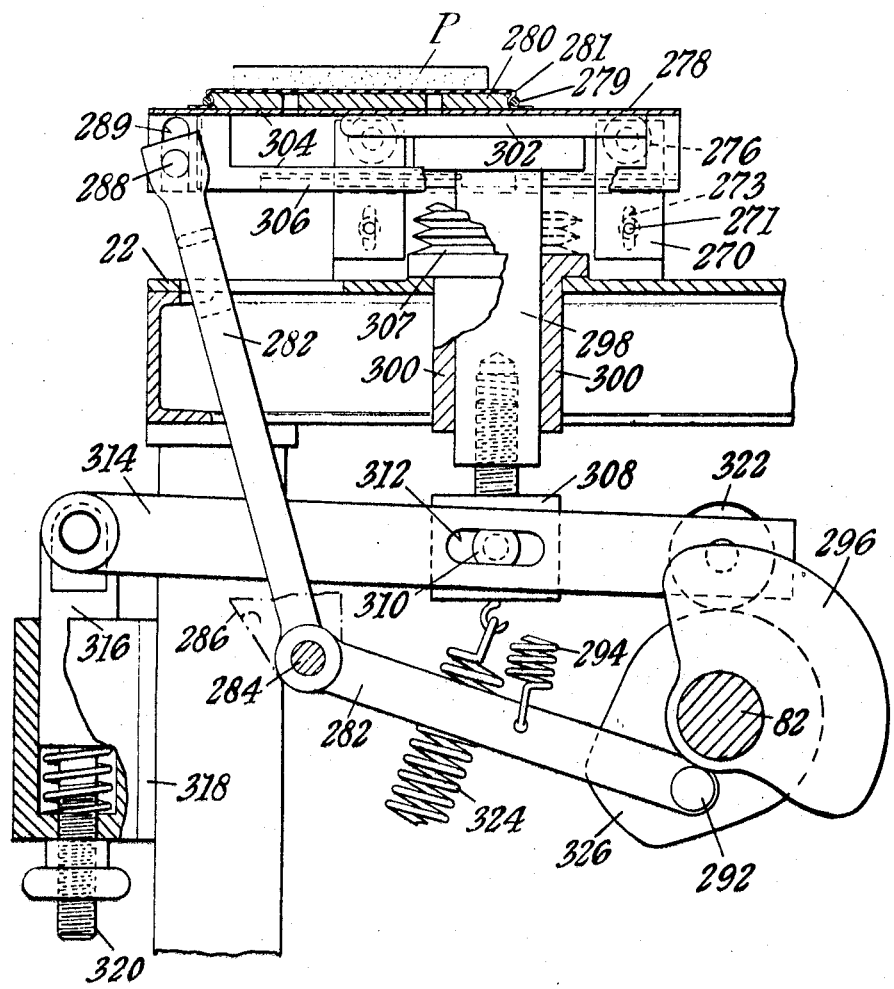
FIG. 8 is a view in left-hand side elevation and largely in section of means of the illustrative machine, including a reciprocable carriage, for transferring clay pieces from a receiving position, where the pieces fall on to the carriage, to a take-off position, where they are transferred to the rotatable heads.
Figure 9:
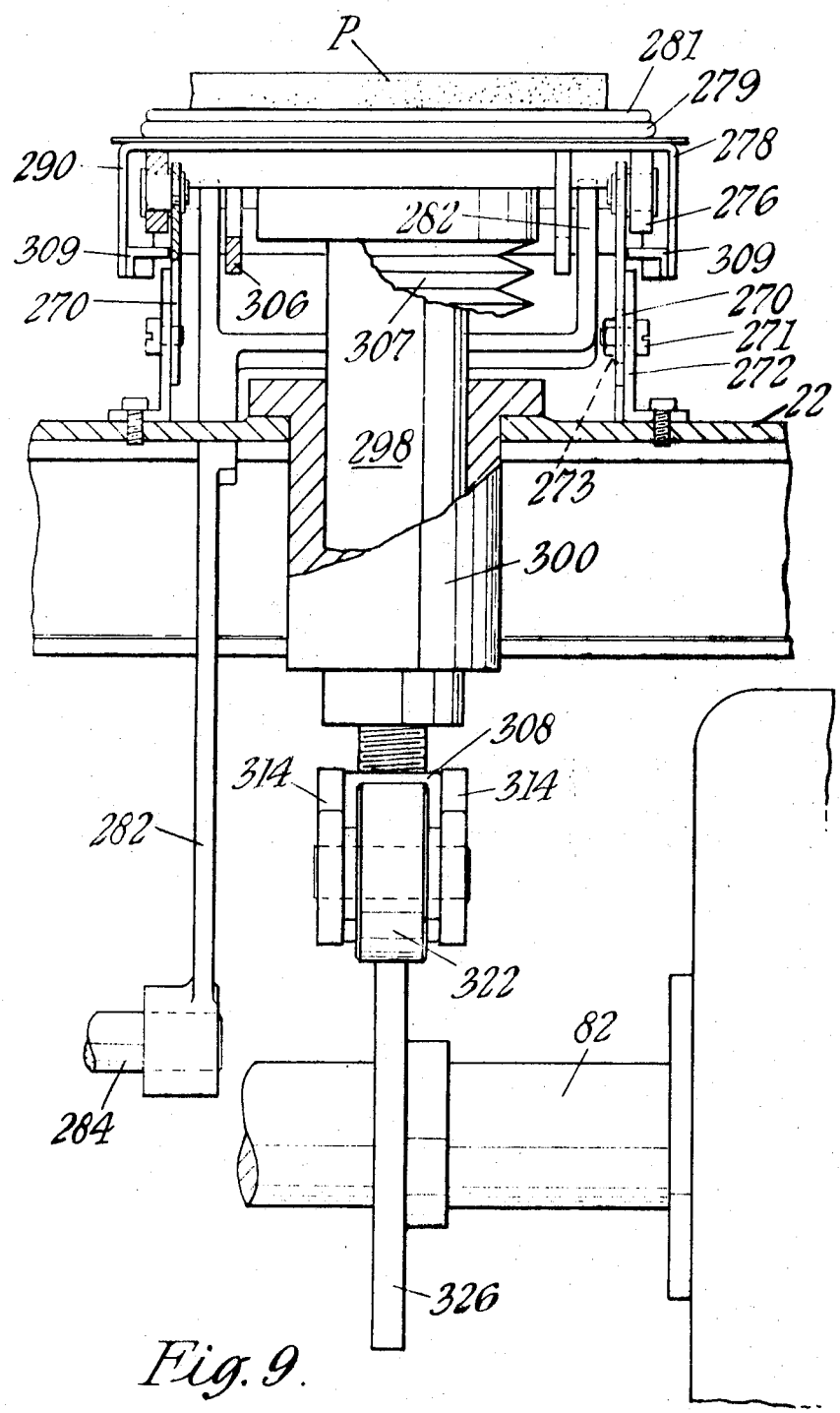
FIG. 9 is a front view, partly in section, of the means shown in FIG. 8.

Arranged opposite station A of the illustrative machine is the automatic clay cutting machine M1 (FIGS. 3 and 4) of the illustrative plant. This machine comprises a conveyor belt 520 arranged to be advanced step by step to carry a column of clay R progressively into the path of a cutting wire 522 stretched horizontally between posts 524 slidable up and down at an angle inclined forwardly at 5° from the vertical in guides 526 (FIG. 4). Means is provided for varying the length of each step of the belt 520 whereby to determine the thickness of the pieces of clay sliced from the column. The clay cutting machine M1 is also provided with means comprising pivoted arms 528 for ensuring that the column of clay at the locality of the cutting wire is centrally disposed on the belt (FIG. 3). The arrangement is such that in the operation of the illustrative plant the column of clay can be advanced by a step below the wire when poised in an upper position, and a piece of clay cut off by the wire as it descends, the clay piece falling on to the platform 280 of the illustrative machine, the platform at such time being at its clay-receiving position (FIG. 8).

A cycle of operation of the illustrative machine in which the casting 40 rotates through 180°, the camshaft 82 through 360° and the shaft 254 through 180° will now be described with reference to FIGS. 15 and 16, such cycle starting with the illustrative plant in a condition in which the carriage 278 of the illustrative machine is at rest at its receiving position with a piece of clay P on the platform 280, and the mould support 450 is in its lowered position with a mould on it. The casting 40 at the beginning of this cycle is in the position (shown in FIGS. 1 to 4) at which the heads 140, 142 are at stations B and D respectively. It is in such a condition that the illustrative machine normally comes to rest awaiting the completion of a shaping operation by the roller flatware making machine M2 and the subsequent movement of the turntable T to remove the mould from the mould support 450 and replace it by a fresh one.

Figure 15:
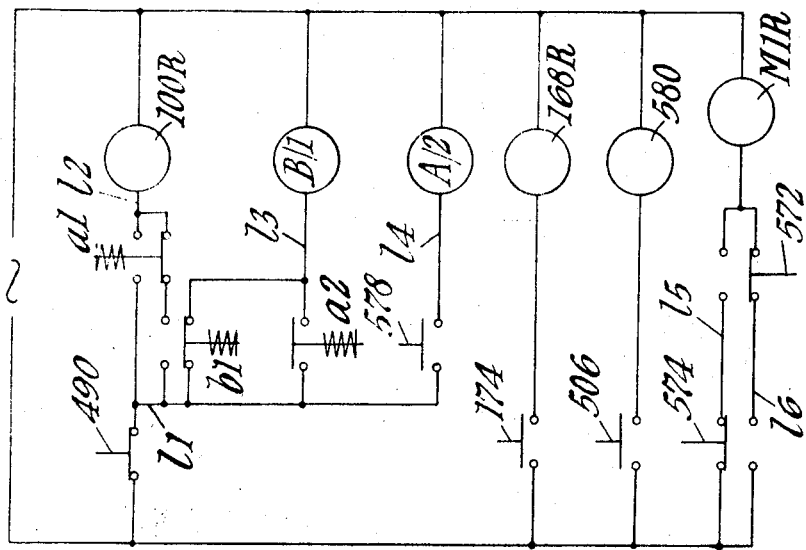
FIG. 15 is a circuit diagram of electrical means for controlling operation of the illustrative machine.

Referring now to FIG. 15, the mould switch 490 is held closed by the mould Q supported by the mould support 450 at the station C, a preformed and trimmed piece of clay being carried by the mould. The holding closed of the switch 490 keeps a relay B/1 energized through lines l1 and l3 and the relay's own contact b1. Also the cams 252 on the now stationary cam shaft 254 are holding the valve 240 to admit suction to the pipe 208 and the valve 246 to admit air under pressure to the pipe 208'. Thus a piece of clay P, ready preformed and trimmed, is held on the porous disc 161 of the head 140. The heads 140, 142 are stationary. The conveyor belt 420 is running continuously, and the face trimming tool 340 and edge trimming tool 380 are being retracted from the clay piece (see FIG. 16).

When the turntable T picks up the mould Q with the clay on it from the support 450, the switch 490 opens, thus de-energizing the relay B/1 the contact b1 of which connected with the line l1 switches from line l3 to line l2. Now, when the turntable T completes its transfer movement and deposits a fresh mould in the mould support 450, the switch 490 closes a circuit through contacts b1, a1 and a solenoid of a relay 100R, which starts the motor 100. Thus the cam shaft 82 begins to rotate. A cam 576 on the cam shaft 82 allows a microswitch 578 (FIGS. 6 and 15) to close to energize a relay A/2 which operates a switch a1 which opens the circuit to the relay 100R through the contact b1 and closes a circuit to the relay directly through the switch 490. Energizing the relay A/2 also closes a contact a2 which energizes the relay B/1 and switches the contact b1 to the line l3.

Rotation of the cam shaft 82 causes the casting 40 to index to the position where the head 140 comes to station C and the head 142 to station A. Meanwhile the face trimming tool 340 and edge trimming tool 380 complete their retraction, and the carriage 278 moves to its takeoff position.

As the casting 40 completes its quarter revolution to bring the heads 142, 140 to rest at the stations A and C respectively, one of the cams 252 operates the valve 246 to connect the cavity 160 of the head 142 to the source of suction and the plunger 298 is raised under the control of the cam 326 to press the clay piece into contact with the porous disc 161 of the head 142, the platform 280 thereafter falling away and peeling the rubber sheet 281 from the piece of clay now held by the head 142 (FIG. 5). The height to which the plunger 298 rises under the control of the cam 326 is preferably adjusted so that the thickness of the clay piece P transferred to the head 142 is reduced by at least one-third and up to one-half of what it was when cut from the column R; a pressure of over 1,000 lbs. will probably be exerted on the piece.

Meanwhile, at station C, the mould Q is raised under the action of the spring 486 (FIG. 3) into pressing engagement with the clay piece P a pressure of about 100 lbs. being exerted on the piece, held by the porous disc 161 of the head 140, the suction in the cavity 160 behind the disc is relieved and the air pressure therein raised above that of the atmosphere by operation of the valve 240 by the other of the cams 252; the mould support is then lowered. The clay piece is thus released from the head and carried down by the mould.

Next, in this cycle of operation, the carriage 278 moves to its receiving position and the casting 40 rotates through 90° to bring the heads 140, 142 to the stations D and B respectively. The switch 174 (FIG. 15) is closed by the cam 176 to actuate a relay 168R which switches on the motor 168 to cause the heads to rotate. At station D, the blade 494 (FIG. 14) wipes away moisture expelled from the porous disc 161 of the head 140. At station B, the face trimming tool 340 (FIG. 2) is raised to operate on the clay piece P held by the head 142, and the edge trimming tool 380 (FIG. 4) is brought into operative position to remove surplus clay. The water spray means 371 squirts a small quantity of water on to the surface of the clay at the beginning of the operation thereon by the tools. The surplus clay falls on to the conveyor belt 420. After the face trimming tool 340 has reached its uppermost position set by adjustment of the screw 362, it falls away and thereafter the edge trimming tool 380 retracts. The piece of clay has now flat, parallel, upper and lower surfaces and a vertical periphery concentric with the axis of rotation of the head 140. Preferably, in adjusting the illustrative machine, the height to which the face trimming tool 340 is raised is such that the thickness of the clay piece is reduced by only a small amount, e.g., about one-eighth, at station B.

Meanwhile, after arrival of the platform 280 at its receiving position, a cam 570 (FIG. 6) operates a switch 572 (FIG. 15) to close a circuit through a switch 574, line l5 and a relay M1R which starts a motor (not sbown) of the clay cutting machine M1. The wire 522 descends to cut off a fresh piece of clay P from the column R and rises again above the level of the column. The piece of clay falls on to the platform 280. The relay M1R is then de-energized by operation of the switch 574 by a cam (not shown) of the clay cutting machine to open line l5 and close a line l6. Subsequently, the cam 570 allows the switch 572 to revert to its previous position (in which it is shown in FIG. 15) in which it closes a circuit through switch 574, line l6 and the relay M1R to start the motor again, the clay cutting machine thereupon completing a cycle of operation in which the conveyor belt 520 moves a step forward and the cam referred to again stops tbe motor by operating the switch 574 to open line l6. Adjustment is provided in the clay cutting machine M1 for varying the length of feed step of the belt 520 (thus to determine the thickness of the clay piece to be cut therefrom), and the machine itself is positioned relative to the illustrative machine so that a clay piece falling on the platform 280 will be brought more or less into alignment with the position assumed by the heads 140, 142 at station A.

At the completion of the dwell period of the heads 140, 142 at stations D and B, the cam 576 on the shaft 82 opens the microswitch 478 (FIG. 15) to de-energize the relay A/2, with the result that the relay 100R is de-energized to stop the motor 100 by switching of the contact a1, contact a2 also opening. It will be appreciated that, because the relay B/1 remains energized, the illustrative machine cannot repeat its cycle until the mould at station C is lifted off the support 450 and replaced by another.

With the illustrative machine thus waiting at the end of this cycle of operation, the turntable T is raised (by means, not shown, associated with the flatware making machine M2), lifting the mould Q from the support 450 (FIG. 11) thus opening the switch 490 and de-energizing the relay B/1, and rotated through 90° and lowered to deposit the mould Q, with the clay piece P on it, on to the jigger head 540 where the clay is shaped by the roller tool of the machine M2, and to deposit an empty mould (if it is carrying one) on the mould support 450 of the illustrative machine, thereupon to initiate another cycle of operation of the illustrative machine.

The casting 40 of the illustrative machine now rotates and, provided the switch 490 (FIG. 11) has been closed by the placing of a fresh mould on the support 450, the foregoing cycle of operation is repeated, but with the head 140 taking the place of the head 142 in the cycle hereinbefore described and the head 142 that of the head 140.

The microswitch 506 (FIGS. 2, 4 and 15) of the detector probe 504 is arranged to energize a relay 580 if the probe is deflected, the relay 580 breaking the circuits to all the electric motors of the illustrative plant, but leaving the control circuit of FIG. 15 energized.

It will be realized that, in the operation of the illustrative machine, the raising of the mould Q and the pressing of it into engagement with the clay piece P while the piece is still in contact with one of the porous discs 161, ensures that the piece is deposited concentrically on the mould Q, and sufficiently firmly retained thereon for there to be little or no risk of its being displaced when the turntable T indexes or the mould itself rotates on the jigger head 540.

Having thus described our invention, what we claim as new and desire to secure by Letters Patent of the United States is:

1. A pottery working machine having spaced operating stations and comprising:

a head at one operating station having a suction operative surface for holding a clay piece delivered thereto;

a support surface on a support member at the one station for initially supporting the clay piece, the head and support member being movable in relative approach and separation for pressing the clay piece to a reduced thickness between the support and clay-holding surfaces and for delivering the clay piece from the support member to the clay-holding surface of the head;

means for limiting the relative movement of approach between the support member and the head for determining the reduced thickness to which the clay piece is pressed;

means for locating the clay-holding head at a subsequent operating station;

means for rotating the clay-holding head at the subsequent station;

means at the subsequent station for trimming the held, reduced clay piece during rotation of the clay-holding head; and means for transferring the reduced, trimmed clay piece from the head to means for further forming the clay.

2. A machine according to claim 1 wherein the trimming means includes means for trimming the periphery of the clay piece and separately operable means for trimming a face of the clay piece.

3. A machine according to claim 1 wherein the further forming means includes a mould support and means for moving the mould support in relative approach with the head to move a mould carried by the mould support into engagement with a clay piece held by the head the mould support being yieldably mounted for determining the pressure exerted upon the clay piece between the mould and the head.

* * * * *